(12) United States Patent
Field et al.

(10) Patent No.: US 6,279,149 B1
(45) Date of Patent: Aug. 21, 2001

(54) AGGREGATE STRUCTURE IDENTIFICATION AND ITS APPLICATION TO PROGRAM ANALYSIS

(75) Inventors: John H. Field, Newtown, CT (US); Ganesan Ramalingam, Croton-on-Hudson; Frank Tip, Mount Kisco, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/159,951

(22) Filed: Sep. 24, 1998

(51) Int. Cl.$^7$ .................................................. G06F 7/45
(52) U.S. Cl. ................................ 717/5; 717/6; 703/23
(58) Field of Search ........................ 717/4, 5, 6; 703/23, 703/25; 707/4; 701/1, 5; 704/10

(56) References Cited

U.S. PATENT DOCUMENTS

| | | | |
|---|---|---|---|
| 5,432,930 | * | 7/1995 | Song ........................................ 707/4 |
| 5,485,616 | * | 1/1996 | Burke et al. .............................. 717/9 |
| 5,490,249 | * | 2/1996 | Miller ..................................... 714/38 |
| 5,652,835 | * | 7/1997 | Miller ..................................... 714/38 |
| 5,675,803 | * | 10/1997 | Preisler et al. ........................... 717/5 |
| 5,790,859 | * | 8/1998 | Sarkar ..................................... 717/4 |
| 5,797,012 | * | 8/1998 | Blainey et al. ........................... 717/5 |
| 5,832,271 | * | 11/1998 | Devanbu .................................. 717/5 |
| 5,896,537 | * | 4/1999 | Landi et al. .............................. 717/4 |
| 5,983,020 | * | 11/1999 | Sweeney et al. ................. 206/308.1 |

OTHER PUBLICATIONS

Gopal, "Dynamic program slicing based on dependence realtions", IEEE, pp 191–200, Aug. 1991.*

Agrawl et al., "Dynamic program slicing", ACM SIGPLAN PLDI, pp 246–256, Jun. 1990.*

Korel et al., "Dynamic program slicing in understanding of program execution", IEEE, pp 80–89, 1997.*

Ashida et al., "Slicing methods using static and dynamic analysis onfromation", IEEE pp 344–350, 1999.*

Song et al., "Forward dynamic object orienetd progarm slicing", IEEE, pp 230–237, Feb. 1999.*

(List continued on next page.)

*Primary Examiner*—Mark Powell
*Assistant Examiner*—Anil Khatri
(74) *Attorney, Agent, or Firm*—Scully, Scott, Murphy & Presser; Casey P. August

(57) ABSTRACT

An efficient program analysis method is provided for lazily decomposing aggregates (such as records and arrays) into simpler components based on the access patterns specific to a given program. This process allows us both to identify implicit aggregate structure not evident from declarative information in the program, and to simplify the representation of declared aggregates when references are made only to a subset of their components. The method can be exploited to yield: (i) a fast type analysis method applicable to program maintenance applications (such as date usage inference for the Year 2000 problem); and (ii) an efficient method for atomization of aggregates. More specifically, aggregate atomization decomposes all of the data that can be manipulated by the program into a set of disjoint atoms such that each data reference can be modeled as one or more references to atoms without loss of semantic information. Aggregate atomization can be used to adapt program analyses and representations designed for scalar data to aggregate data. In particular, atomization can be used to build more precise versions of program representations such as SSA form or PDGs. Such representations can in turn yield more accurate results for problems such as program slicing. Our techniques are especially useful in weakly-typed languages such as Cobol (where a variable need not be declared as an aggregate to store an aggregate value) and in languages where references to statically-defined sub-ranges of data such as arrays or strings are allowed.

22 Claims, 11 Drawing Sheets

OTHER PUBLICATIONS

Korel et al, "Program slicing in undersatnding of large program", IEEE pp 145–152, Mar. 1998.*

Jiang et al., "Program slicing for C the problem in implementation", IEEE pp 182–190, Aug. 1991.*

Venkatesh, "The semantic approach to program slicing", ACM SIGPLAN PLDI, pp 107–119, Jun. 1991.*

Sinha et al, "System dependence graph based slicing of program with arbitaray interprocedural control flow", ACMICSE, pp 432–441, 1999.*

Binkey et al, "An empircal study of amorphous slicing as a program comprehension support tool", IEEE, pp 161–170, 2000.*

Zhao, "A slicing based approach to extracting reusable software architecturs", IEEE, pp 1–9, 2000.*

Visser et al, "Modle checking programs", IEEE, pp 3–11, 2000.*

Weiser, M., "Program Slices: Formal, Psychological, and Practical Investigations of an Automatic Program Abstraction Method", UMI Dissertation Services, Degree Date: 1979.

Weiser, M., "Program Slicing", IEEE Transactions on Software Engineering, vol. SE–10, No. 4, Jul. 1984, p. 352–357.

Aiken, A. et al., "The Complexity of Set Constraints", Computer Science Logic. 7th Workshop, CSL '93 Selected Papers 1994, p. 1–17.

Cytron, R. et al., "Efficiently Computing Static Single Assignment Form and the Control Dependence Graph", ACM Transactions on Programming Languages & Systems, vol. 13, No. 4, Oct. 1991, p. 451–490.

Fahndrich, M. et al., "Program Analysis Using Mixed Term and Set Constraints", Static Analysis. 4th Int'l. Symposium, SAS '97 Proceedings 1997, p. 114–126.

Ferrante, J. et al., "The Program Dependence Graph and Its Use in Optimization", ACM Transactions on Programming Languages & Systems, vol. 9, No. 3, Jul. 1987, p. 319–349.

Knight, K., "Unification: A Multidisciplinary Survey", ACM Computing Surveys, vol. 21, No. 1, Mar. 1989, p. 93–124.

Milner, R., "A Theory of Type Polymorphism in Programming", Journal of Computer & System Sciences 17, 1978, p. 348–375.

O'Callahan, R., et al., "Lackwit: A Program Understanding Tool Based on Type Inference", Proceedings of the 1997 Int'l. Conference on Software Engineering, ICSE 97 1997 p. 338–348.

Shapiro, M., et al., "Fast and Accurate Flow–Insensitive Points–to–Analysis", Proceedings of the 1997 24th ACM SIGPLAN–SIGACT Symposium on Principles of Programming Languages, POPL '97 p. 1–14.

Steensgaard, B., "Points–To Analysis By Type Inference of Programs With Structures and Unions", Compiler Construction, 6th Int'l. Conference, CC'96, Linkoping, Sweden, Apr. 24–26, 1996 Proceedings, p. 136–150.

Steensgaard, B., "Points–To Analysis in Almost Linear Time", ACM Press Conference Record of POPL '96: The 23rd ACM Sigplan–Sigact Symposium on Principles of Program. Lang, St. Petersburg Beach, FL, Jan. 21–24, 1996 p. 32–41.

Tip, F., "A Survey of Program Slicing Techniques", Journal of Programming Languages 3, 1995, p. 121–189.

* cited by examiner

```
01 A.                        // A is a record containing:
    05 F1 PIC 99.            // field F1: 2 characters of numeric data
    05 F2 PIC 99.            // field F2: 2 characters of numeric data
    05 F3 PIC XX.            // field F3: 2 unconstrained characters
    05 F4 PIC XX.            // field F4: 2 unconstrained characters
01 B PIC X(8).               // B 8 unconstrained characters
01 C PIC X(8).               // C 8 unconstrained characters
01 D.                        // D is a record containing:
    05 F5 PIC 99.            // field F5: 2 characters of numeric data
    05 F6 PIC 99.            // field F6: 2 characters of numeric data
    05 F7 PIC XX.            // field F7: 2 unconstrained characters
    05 F8 PIC XX             // field F8: 2 unconstrained characters
01 RESULT PIC 99.            // RESULT contains 2 characters of numeric data MOVE 17 TO F1.               // assign the value 17 to field F1 of A
MOVE 18 TO F2.               // assign the value 18 to field F2 of A
MOVE A TO B.                 // assign A to B
MOVE B TO C.                 // assign B to C
MOVE C TO D.                 // assign C to D
MOVE F5 TO RESULT.           // assign the value of field F5 of D to RESULT
```

Fig. 2

```
01 DAYS-RECORD.
    02 WEEKDAYS OCCURS 7 TIMES.                              // WEEKDAYS is an array with 7 fields:
        05 DAY       PIC X(20).                              // of 20 characters each
    02 DAYS-BY-NAME REDEFINES WEEKDAYS.                      // overlaid with a record with 7 elements
        05 SUNDAY    PIC X(20) VALUE IS "SUNDAY".            // initialize to "SUNDAY"
        05 MONDAY    PIC X(20) VALUE IS "MONDAY".            // initialize to "MONDAY"
        05 TUESDAY   PIC X(20) VALUE IS "TUESDAY".           // initialize to "TUESDAY"
        05 WEDNESDAY PIC X(20) VALUE IS "WEDNESDAY".         // initialize to "WEDNESDAY"
        05 THURSDAY  PIC X(20) VALUE IS "THURSDAY".          // initialize to "THURSDAY"
        05 FRIDAY    PIC X(20) VALUE IS "FRIDAY".            // initialize to "FRIDAY"
        05 SATURDAY  PIC X(20) VALUE IS "SATURDAY".          // initialize to "SATURDAY"
```

Fig. 3

```
01 DATA-RECORD.
   02 DATE.
      03 YY        PIC 99.                           // year
      03 MM        PIC 99.                           // month
      03 DD        PIC 99.                           // day
   02 PRINTABLE-DATE REDEFINES DATE PIC X(6).        // treat structured date as string for use in I/O
   02 ...                                            // additional fields with non-date information 01 OUTPUT-BUFFER.
   02 LINE         PIC X(80).                        // 80-column output line
   02 COLUMNS REDEFINES LINE.                        // output columns defined separately
      05 COLUMN-1  PIC XX.
      05 COLUMN-2  PIC XX.
      05 ...

01 PRODUCT-INFORMATION.
   02 COLUMN-1-INFO PIC XX.
   02 COLUMN-2-INFO PIC XX.
   02 ...

MOVE FUNCTION CURRENT-DATE TO DATE OF DATA-RECORD.   // use library function to read current date
...
MOVE PRINTABLE-DATE(1:2) TO COLUMN-1.                // assign only first two characters of date string
...
MOVE PRODUCT-INFORMATION TO OUTPUT-BUFFER.
```

Fig. 4

```
YY OF DATE OF DATA-RECORD              → {yearRelated}
MM OF DATE OF DATA-RECORD              → {notYearRelated}
DD OR DATE OF DATA-RECORD              → {notYearRelated}
PRINTABLE-DATE[1:2] OF DATA-RECORD     → {yearRelated}
PRINTABLE-DATE[3:4] OF DATA-RECORD     → {notYearRelated}
PRINTABLE-DATE[5:6] OF DATA-RECORD     → {notYearRelated}
LINE[1:2] OF OUTPUT-BUFFER             → {yearRelated}
COLUMN-1 OF COLUMNS OF OUTPUT-BUFFER   → {yearRelated}
COLUMN-1-INFO OF PRODUCT-INFORMATION   → {yearRelated}
```

Fig. 5

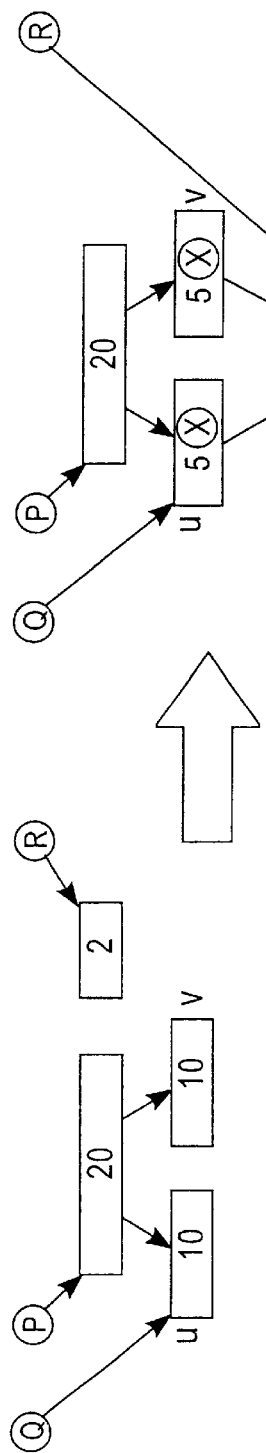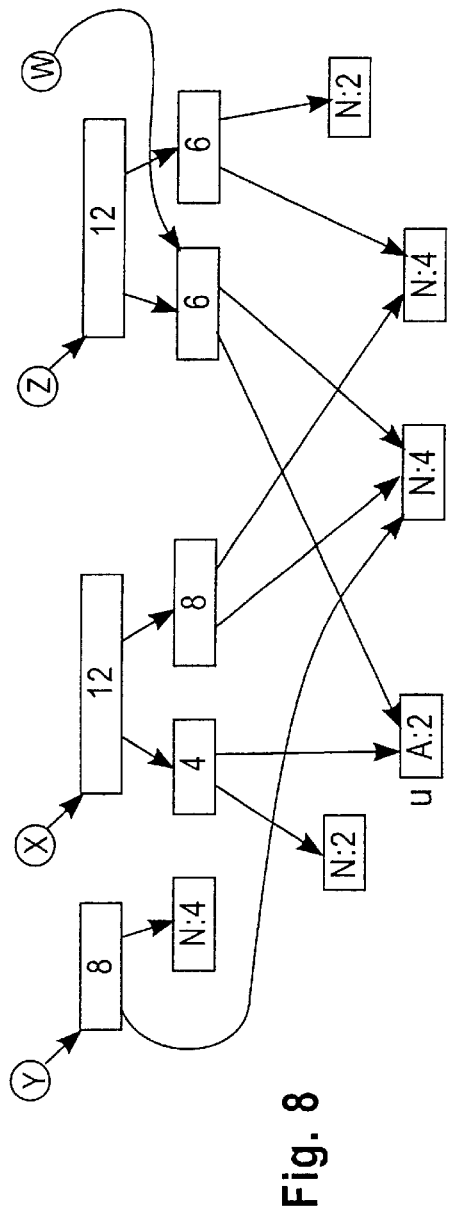
Fig. 7a
Fig. 7b
Fig. 8

```
     // An implementation of union-find with the following signature is assumed
[1]  type 'a eqClass
[2]  val newvar:    'a -> 'a eqClass
[3]  val union:     ('a eqClass * 'a eqClass *' 'a) -> unit
[4]  val equivalent: ('a eqClass * 'a eqClass) -> bool
[5]  val findval:   'a eqClass -> 'a
[6]  val setval:    ('a eqClass * 'a) -> unit // A semi-lattice L of types is assumed, with a join/meet operator U
     // and least element ⊥
[7]  type L
[8]  val U :  L * L -> L
[9]  val ⊥ :  L

[10] datatype term-value = atom (L, int) | pair (term-var, term-var) | array (int, term-var)
[11] and type term-var = term-value eqClass

[12] fun |x| =
[13]    case (findval x) of
[14]       atom (c, 1)     => 1 |
[15]       pair (x1, x2)   => |x1| + |x2| |
[16]       array (n, e)    => n * |e|

[17] fun new v =
[18]    case v of
[19]       array (1, e)    => e |
[20]       otherwise       => newvar v

[21] fun split (x, n) =
[22]    if (0 < n) and (n < |x|) then
[23]       case (findval x) of
[24]          atom (c, 1)   => setval(x, pair ( new atom (c, n), new atom (c, 1-n))) |
[25]          pair (x1, x2) => if (n < |x1|) then split (x1,n) else split (x2,n-|x1|) fi |
[26]          array (m, e)  => let val p = max(1, n/|e|) in
[27]                              setval(x, pair ( new array (p, e), new array (m-p, e) ));
[28]                              split (x,n)
[29]                           end
[30]    fi

[31] fun refine (x, n) =
[32]    case (findval x) of
[33]       pair (x1, x2)  => [x1, x2] |
[34]       atom (c, 1)    => split (x,n); refine (x,n) |
[35]       array (m, e)   => let val p = max(1, n/|e|) in
[36]                            setval(x, pair ( new array (p, e), new array (m-p, e)));
[37]                            refine (x,n)
[38]                         end

[39] fun update (x, c) =
[40]    case (findval x) of
[41]       atom (c', 1)   => setval(x,atom (c U c', 1))) |
[42]       pair (x1, x2)  => update (x1, c); update (x2, c) |
[43]       array (m, e)   => update (e, c)
```

Fig. 9a

```
[44] fun unify (x,y) =
[45]    if (not (equivalent(x,y))) then
[46]       // Merge the two vars into one, setting the value of the merged var to ...
[47]       union(x, y,
[48]           // ... the join of the current values of x and y
[49]           case (findval x, findval y) of
[50]               (atom (c, 1), yval) => unify-atom(y,c) |
[51]               (xval, atom (c, 1)) => unify-atom(x,c) |
[52]               (pair (x1, x2), yval) => unify-list([x1,x2], [y]) |
[53]               (xval, pair (y1, y2)) => unify-list([x], [y1,y2]) |
[54]               (array (m1, e1), array (m2, e2)) => unify-arrays((m1,e1), (m2,e2))
[55]           )
[56]    fi;
[57]    findval x // return the value associated with the merged equivalence class

[58] fun unify-atom(x,c) = update(x,c); findval x

[59] fun unify-list(x1::r1, x2::r2) =
[60]    if (|x1| = |x2|) then
[61]       case (r1,r2) of
[62]           ([],[]) => unify (x1,x2) |
[63]           otherwise => pair ( new unify (x1,x2),  new unify-list(r1,r2))
[64]    elsif (|x1| > |x2|) then unify-list( refine(x1,|x2|) @ r1, x2::r2)
[65]    else /* (|x1| < |x2|) */ unify-list( x1::r1, refine(x2,|x1|) @ r2)
[66]    fi

[67] fun unify-arrays( (m1,e1), (m2,e2) ) =
[68]    let
[69]       fun exp (t,1) = t | exp (t,i) = new pair (t, exp(t,i-1))
[70]       val lcm = least-common-multiple(|e1|,|e2|)
[71]       val x1 = exp(e1, lcm / |e1|) )
[72]       val x2 = exp(e2, lcm / |e2|) )
[73]       val z = array ((m1* |e1| / |x1|), x1)
[74]    in
[75]       unify (x1, x2);
[76]       z
[77]    end
```

Fig. 9b

```
[78] datatype DataRef = ProgVar of term-var | DataRef [ int : int ] | DataRef \ int

[79] fun convert (dataref) =
[80]     case dataref of
[81]         ProgVar x => x |
[82]         d [ i : j ] =>
[83]             let
[84]                 val x = convert d
[85]                 val x1 = new atom (⊥, i-1)
[86]                 val x2 = new atom (⊥, j-i+1)
[87]                 val x3 = new atom (⊥, |x| - j)
[88]             in
[89]                 unify ( x, pair (x1, pair (x2, x3)));
[90]                 x2
[91]             end |
[92]         d \ n =>
[93]             let
[94]                 val x = convert d
[95]                 val y = new atom (⊥, |x| / n)
[96]             in
[97]                 unify (x, array (n, y));
[98]                 y
[99]             end

[100]fun processStatement ( d1 ← d2 ) = unify ( convert d1, convert d2 )

[101]fun processConstraint ( d ⊵ c ) = update (convert d, c)

[102]fun typeAnalyze ( program, typeConstraints ) =
[103]    for every assignment statement d1 ← d2 in program do
[104]        processStatement ( d1 ← d2 )
[105]    end
[106]    for every constraint d ⊵ c in typeConstraints do
[107]        processConstraint ( d ⊵ c )
[108]    end
```

Fig. 10

```
[109]datatype Atom = ...  // some id/label to represent atoms
[110]datatype AtomicReference = Atom \ int
[111]datatype AtomicTree =
[112]    atom2 (Atom,int,int) | pair2 (AtomicTree, AtomicTree) | array2 (AtomicTree, int)

[113]fun normalize (pair2 (pair2 (x1, x2), x3)) = normalize(pair2 (x1, pair2 (x2, x3))) |
[114]    normalize (pair2 (x1, x2)) = pair2 (normalize x1, normalize x2)
[115]    normalize (array2 (x, i)) = array2 (normalize x, i)
[116]    normalize (atom2 (a,l,mu)) = atom2 (a,l,mu)

[117]fun tail (t, 1) = t |
[118]    tail (pair2 (x1, x2), i) = tail (x2, i - |x1|)

[119]fun head (pair2 (x1, x2), i) =
[120]         if (i > |x1|) then
[121]             pair2 (x1, head (x2, i - |x1|))
[122]         else
[123]             x1|
[124]    head (t, s) = t

[125]fun subrange (t, i, j) = head ( tail(t,i), j-i+1 )

[126]fun breakup (t,s) =
[127]    if (|t| = s) then { t } else
[128]    case t of
[129]        pair2 (x1, x2) =>
[130]            if (|x1| > s) then
[131]                breakup(x1,s) U breakup(x2,s)
[132]            else
[133]                { head(t,s) } U breakup( tail(t,s+1), s)
[134]            fi |
[135]        array2 (x, i) => breakup(x,s)

[136]fun mkAtomicTree (x, mu) =
[137]    case (findval x) of
[138]        atom (c, 1) => atom2 (generate new atom id,l,mu) |
[139]        pair (y, z) => pair2 (mkAtomicTree (y,mu), mkAtomicTree (z,mu)) |
[140]        array (i, y) => array2 ((mkAtomicTree (y,mu*i)), i)

[141]fun atomizeVar (x) = normalize (mkAtomicTree (x,1))

[142]fun atomizeRef(d) = { atomizeTree(t) | t ∈ (treesOf d) }

[143]fun treesOf(ProgVar x) = { atomicForm[x] } |
[144]    treesOf(d [i:j]) = { subrange (t, i, j) | t ∈ treesOf(d) } |
[145]    treesOf(d\n) = U_{t∈treesOf(d)} breakup(t, |t|/n)

[146]fun atomizeTree(atom2 (a,l,mu)) = [ a \ mu ] |
[147]    atomizeTree(pair2 (x1, x2)) = atomizeTree(x1) @ atomizeTree(x2) |
[148]    atomizeTree(array2 (x, i)) = map (fn (a\n) => a\(n/i)) atomizeTree(x) |
```

Fig. 11a

```
[149] datatype AtomicStmt =
          AtomicRef ← AtomicRef |
          StmtSeq (AtomicStmt, AtomicStmt) |
          IfThenElse (AtomicStmt, AtomicStmt)

[150] fun doAll [stmt] = stmt | doAll (h::t) = StmtSeq(h, doAll t)

[151] fun doOne [stmt] = stmt | doOne (h::t) = IfThenElse(h, doAll t)

[152] fun atomSeqCopy (s1, s2) = doAll { s1(i) ← s2(i) | 1 ≤ i ≤ min(|s1|,|s2|) }

[153] fun atomizeStmt ( d1 ← d2 ) =
[154]     doOne { atomSeqCopy(s1,s2) | s1 ∈ atomizeRef(d1), s2 ∈ atomizeRef(d2) }

[155] fun atomizeProgram (program) =
[156]     for every assignment statement d1 ← d2 in program do
[157]         processStatement ( d1 ← d2 )
[158]     end
[159]     for every other data-reference d in program do
[160]         convert (d)
[161]     end
[162]     for every program variable x in program do
[163]         set atomicForm[x] := atomizeVar (x)
[164]     end
[165]     for every copy assignment statement d1 ← d2 in program do
[166]         replace ( d1 ← d2 ) by atomizeStmt (d1 ← d2)
[167]     end
[168]     for every other data-reference d in program do
[169]         replace d by atomizeRef (d)
[170]     end
```

Fig. 11b

AGGREGATE STRUCTURE IDENTIFICATION AND ITS APPLICATION TO PROGRAM ANALYSIS

BACKGROUND OF THE INVENTION

1. Field of the Invention

The present invention relates to analysis of computer programs.

2. Description of the Related Art

Many algorithms for static analysis of imperative programs make the simplifying assumption that the data manipulated by a program consists of simple atomic values, when in reality aggregates such as arrays and records are usually predominant. By "atomic value" (also referred to as an "atom" or "scalar") we mean a value that is treated as an indivisible (single logical) unit by the program. As an example, a program might treat a person's age as an atomic value. An aggregate, by contrast, consists of two or more logical units of information, and the program might refer to or manipulate one of these units of information independent of the other units of information. For example, a program may treat a person's date-of-birth as an aggregate consisting of three logical units of information: the year-of-birth, the month-of-birth, and the day-of-birth. In particular, a statement in the program may make use of the year-of-birth, ignoring the month and day information.

There are several straightforward approaches to adapting analysis algorithms designed for scalars to operate on aggregates:

1. Treat each aggregate as a single scalar value.
2. Decompose each aggregate into a collection of scalars, each of which represents one of the bytes (or bits) comprising the aggregate.
3. Use the declarations (variable and type declarations) in the program to break up each aggregate into a collection of scalars, each of which represents a declared component of the aggregate containing no additional substructures of its own.

Unfortunately, each of these approaches has drawbacks. The first approach can yield very imprecise results. While the second approach is likely to produce precise results, it can be prohibitively expensive. Finally, the third approach appears at first blush to be the obvious solution. However, it is unsatisfactory in weakly-typed languages such as Cobol, where a variable need not be explicitly declared as an aggregate in order for it to contain composite data. Even in more strongly-typed languages, declarative information alone can be insufficient because loopholes in the type system (such as typecasts) may permit aggregate values to interoperate with non-aggregate values; untagged unions also complicate matters. Moreover, the third approach may produce unnecessarily many scalar components when the program only accesses a subset of those components. Finally, in languages where aggregate components may overlap one another in storage inexactly, checks for storage disjointness (which tend to occur in inner loops of analysis algorithms) may prove expensive.

SUMMARY OF THE INVENTION

The present invention is a computer-implemented method for lazily decomposing aggregates into simpler components based on the access patterns specific to a given program. This process allows us both to identify implicit aggregate structure not evident from declarative information, and to simplify the representation of declared aggregates when references are made only to a subset of their components. In particular, the method analyzes the statements in the program and identifies the different logical units of information (referred to as "atoms" below) in each aggregate that are utilized by the program. In terms of the date-of-birth example given above, the date-of-birth may be treated as an atom if the program never makes use of the year, month, or day information independently. Thus, the method determines which variables may be treated as atoms based on how the program accesses information in the variables. Further, if a variable is to be treated as an aggregate, the method also determines the "structure" of the aggregate variable: that is, the set of atoms that make up this aggregate variable. We refer to this as "atomization" of the aggregate.

Thus, after atomization, each reference to an aggregate can be expressed as a set of references to disjoint atoms. The resulting atoms may then be treated as scalars for the purposes of analysis, and checks for overlapping storage reduce to equality tests on atoms.

The method can be exploited to yield: (i) a fast type analysis method applicable to program maintenance applications (such as date usage inference for the Year 2000 problem); and (ii) an efficient method for atomization of aggregates. More specifically, aggregate atomization decomposes all of the data that can be manipulated by the program into a set of disjoint atoms such that each data reference can be modeled as one or more references to atoms without loss of semantic information.

Aggregate atomization can be used to adapt program analyses and representations designed for scalar data to aggregate data. In particular, atomization can be used to build more precise versions of program representations such as SSA form or PDGs. Such representations can in turn yield more accurate results for problems such as program slicing. Our techniques are especially useful in weakly-typed languages such as Cobol (where a variable need not be declared as an aggregate to store an aggregate value) and in languages where references to statically-defined sub-ranges of data such as arrays or strings are allowed.

BRIEF DESCRIPTION OF THE DRAWINGS

FIG. 2 is an exemplary COBOL program illustrating assignments between aggregate and non-aggregate variables;

FIG. 3 is an exemplary Cobol program illustrating overlaid arrays and records;

FIG. 4 is an exemplary Cobol program illustrating type analysis for the year 2000 (Y2K) problem;

FIG. 5 is a table illustrating the results of the type analysis of FIG. 4;

FIGS. 7(A) and (B) is a pictorial illustration of the method for determining array equivalence according to the present invention;

FIG. 8 is a pictorial illustration of method for performing type analysis for the Y2K problem according to the present invention; N is an abbreviation for NotAffected and A is an abbreviation for Affected;

FIGS. 9(A) and (B) is pseudo-code illustrating a method for unifying a pair of terms according to the present invention;

FIG. 10 is pseudo-code illustrating a method for performing type analysis according to the present invention; and FIGS. 11(A) and (B) is pseudo-code illustrating an atomization method according to the present invention.

DETAILED DESCRIPTION OF THE PRESENT INVENTION

Figure 1:
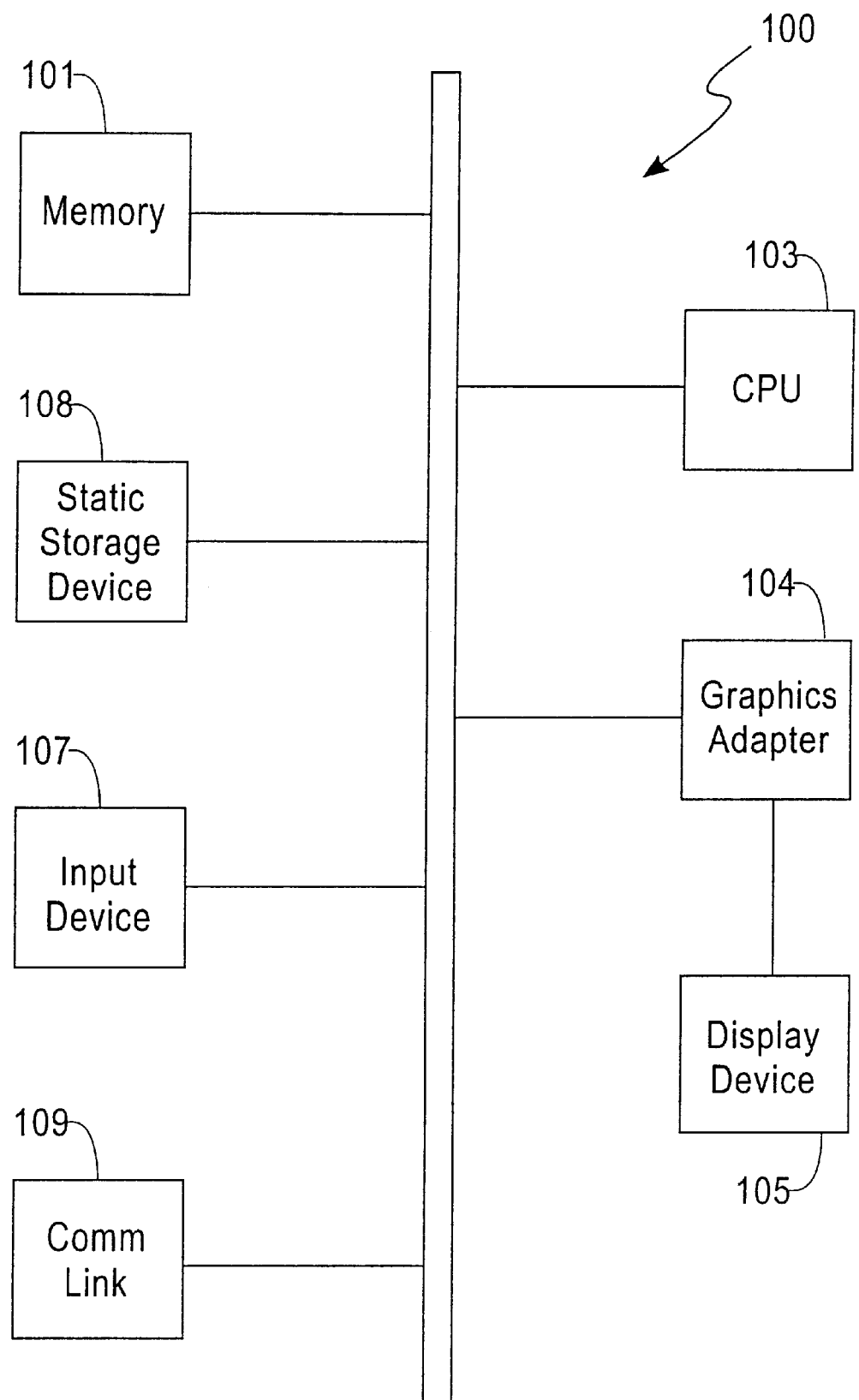
FIG. 1 is a block diagram of a computer processing system wherein the pattern discovery method of the present invention may be embodied.

The present invention may be implemented on any computer processing system including, for example, a personal computer or a workstation. As shown in FIG. 1, a computer processing system 100 as may be utilized by the present invention generally comprises memory 101, at least one central processing unit (CPU) 103 (one shown), and at least one user input device 107 (such as a keyboard, mouse, joystick, voice recognition system, or handwriting recognition system). In addition, the computer processing system includes a nonvolatile memory, such as (ROM), and/or other nonvolatile storage devices 108, such as a fixed disk drive, that stores an operating system and one or more application programs that are loaded into the memory 101 and executed by the CPU 103. In the execution of the operating system and application program(s), the CPU may use data stored in the nonvolatile storage device 108 and/or memory 101. In addition, the computer processing system includes a graphics adapter 104 coupled between the CPU 103 and a display device 105 such as a CRT display or LCD display. In addition, the computer processing system may include a communication link 109 (such as a network adapter, RF link, or modem) coupled to the CPU 103 that allows the CPU 103 to communicate with other computer processing systems over the communication link, for example over the Internet. The CPU 103 may receive portions of the operating system, portions of the application program(s), or portions of the data used by the CPU 103 in executing the operating system and application program(s). Preferably, the application program(s) executed by the CPU 103 perform the methods of the present invention as set forth below.

According to the present invention, aggregates in the program are decomposed into simpler components based on access patterns of the aggregates in the program. This process identifies implicit aggregate structure not evident from declarative information, and simplifies the representation of declared aggregates when references are made only to a subset of their components. In particular, the method analyzes the statements in the program and identifies the different logical units of information (referred to as "atomic units" or "atoms" below) in each aggregate that are utilized by the program. By "atomic unit" we mean a unit of information that is treated as an indivisible unit (i.e., a single logical unit) by the program. In other words, the program never accesses a proper subcomponent of the components of information stored by an atomic unit. As an example, a program might treat a person's age as an atomic value. An aggregate, by contrast, consists of two or more logical units of information, and the program might refer to or manipulate one of these units of information independent of the other units of information. For example, a program may treat a person's date-of-birth as an aggregate consisting of three logical units of information: the year-of-birth, the month-of-birth, and the day-of-birth. In particular, a statement in the program may make use of the year-of-birth, ignoring the month and day information. In terms of this example, the date-of-birth may be treated as an atom if the program never makes use of the year, month, or day information independently. Thus, the method of the present invention determines which variables may be treated as atoms based on how the program accesses information in the variables. Further, if a variable is to be treated as an aggregate, the method of the present invention determines the "structure" of the aggregate variable: that is, the set of atoms that make up this aggregate variable. We refer to this as "atomization" of the aggregate.

After atomization, each reference to an aggregate can be expressed as a set of references to disjoint atoms. The resulting atoms may then be treated as scalars for the purposes of analysis, and checks for overlapping storage reduce to equality tests on atoms.

Atomization can thus serve as an enabling technique for performing various program analyses such as computing reaching definitions as described in Aho, A., Sethi, R., and Ullman, J. "Compilers. Principles, Techniques and Tools," Addison-Wesley, 1986, herein incorporated by reference in its entirety, and program slicing as described in Tip, F., "A survey of program slicing techniques," Journal of Programming Languages 3, 3 (1995), pp. 121–189, and Weiser, M., "Program slices: formal, psychological, and practical investigations of an automatic program abstraction method," PhD thesis, University of Michigan, Ann Arbor, 1979, herein incorporated by reference in their entirety.

In addition, atomization can serve as an enabling technique for constructing underlying representations of a program in the presence of aggregates. For example, atomization can be used in constructing a program dependence graph (PDG) as described in Ferrante, J., Ottenstein, K., and Warren, J., "The program dependence graph and its use in optimization," ACM Transactions on Programming Languages and Systems 9, 3 (1987), 319–349, herein incorporated by reference in its entirety, or in computing a static single assignment (SSA) form as described in Cytron, R., Ferrante, J., Rosen, B. K., Wegman, M. N., and Zadeck, F., "Efficiently computing static single assignment form and the control dependence graph," ACM Transactions on Programming Languages and Systems 13, 4 (1991), 451–490, herein incorporated by reference in its entirety.

In addition, a variant of the method can be used to efficiently solve certain type analysis problems. One instance of such a problem is date usage inference for programs affected by the Year 2000 problem. This is an instance of a general class of problems that require inferring undeclared but related usages of type information for various software maintenance and verification activities as described in O'Callahan, R., and Jackson, D. "Lackwit: A program understanding tool based on type inference," Proceedings of the 1997 International Conference on Software Engineering (ICSE'97) (Boston, Mass., May 1997), pp. 338–348, herein incorporated by reference in its entirety.

Consider the Cobol fragment shown in FIG. 2. The meaning of the declarations in the example is as follows: The program contains top-level declarations of variables A, B, C, D, and RESULT. Variables A and D are both declared as records of four fields: F1 through F4, and F5 through F8, respectively. The types of these fields are declared using so-called picture clauses, which are a compact means of expressing both the length and the allowable types of the sequence of characters that constitute the fields. The characters that follow the keyword PIC specify the types of characters that are allowed at corresponding locations in the field. For instance, a '9' character indicates numerical data, whereas an 'X' character indicates that any character is allowed. Hence, variables A and D both consist of 4 numeric characters followed by 4 unconstrained characters. A picture character may be followed by a parenthesized repetition factor. The non-aggregate variables B and C thus each consist of eight unconstrained characters. The example program contains a number of assignments. Note that in Cobol, it is not necessary to name parent structures in data references when field references alone are unambiguous (e.g., in the assignment of 17 to field F1 of A).

Suppose that one is interested in computing the backwards program slice with respect to the final value of RESULT (i.e., the set of assignments that could affect the final value of RESULT). Since our example program does not contain any control flow constructs, the slice contains any statement on which the final value of RESULT is transitively data-dependent. We assume that the following model is used to compute these data dependences:

All variables are decomposed into disjoint atoms by some means.

Each MOVE statement is modeled as a set of atomic assignments between corresponding atoms.

Data dependences are determined by tracing def-use chains between atomic assignments.

Clearly, an atomization that is too crude will lead to redundant statements in the slice. For example, treating the statement MOVE B TO C as a scalar assignment between two atomic variables will lead to the inclusion in the slice of the superfluous statement MOVE 18 TO F2. On the other hand, if the atomization is too fine-grained, the number of data dependences that must be traced to compute the slice will be larger than necessary and representations that capture these dependences (such as PDGs) will also be larger than necessary. For example, breaking up each variable into character-sized atoms leads to the desired slice (one that omits MOVE 18 TO F2). However, the same result can be achieved with the following, much coarser-grained atomization, which is produced by our atomization method:

atomization(A)=(A [1 : 2]; A[3 : 4]; (A [5 : 8])
atomization(B)=(B [1 : 2]; B[3 : 4]; B[5 : 8])
atomization(C)=(C [1 : 2]; C[3 : 4]; C[5 : 8])
atomization(D)=(D [1 : 2]; D[3 : 4]; D[5 : 8])

Here, we use array notation to indicate sub-ranges of the characters occupied by a variable (e.g., B[3 : 4] denotes the sub-range consisting of character 3 and character 4 of variable B). There are a few interesting things to note about this solution:

Fields F1 and F2 cannot be merged into a single atom without a loss of precision, and therefore correspond to separate atoms.

Field F3 and F4 are merged, because the distinction between these fields is irrelevant for this particular program. In general, merging fields can lead to faster dataflow analysis and more compact program representations.

Although variables B and C are both declared as scalar variables, both must be partitioned into three atoms in order to obtain precise slicing results.

FIG. 3 depicts a more problematic example, in which an array, WEEKDAYS, is overlaid with a record, DAYS-BY-NAME, which specifies an initial value for each of its fields. Overlaying of records and arrays is a fairly common idiom in Cobol, and allows programmers to refer to array elements by name as well as by index (e.g., when iterating uniformly through the collection represented by the array). Our structure identification method differentiates between references to the array as a whole, references to array sub-ranges with statically-determinable indices (references to the elements of DAYS-BY-NAME in the example of FIG. 2 are treated as single-element instances of sub-range references), and references to arbitrary elements via indices computed at run-time. These distinctions can be exploited to yield better atomizations that accurately differentiate among these cases.

FIG. 4 shows a program fragment that manipulates dates in ways similar to those of Cobol programs affected by the Year 2000 (Y2K) problem. Here, DATA-RECORD represents a record containing date and non-date information. The storage for date information is redefined in two different ways: DATE is a structured record containing separate fields for month, day, and year digits, while IO-DATE is an unstructured string of unconstrained characters intended to be used for input or output. Since the YY field of DATE is only two digits long, it would have to be expanded to four digits to account for post-1999 dates. In addition, COLUMN-1 of OUTPUT-BUFFER (here representing a multipurpose string used for input/output purposes) would have to be expanded to account for the fact that years are now larger. This could in turn affect PRODUCT-INFORMATION as well, since even though the latter never contains a year value, it would probably have to be updated to account for the fact that the first column of OUTPUT-BUFFER is now two characters wider.

The aggregate structure identification method can be utilized to assist in remediating field expansion problems (such as the Y2K problem) by viewing it as a flow-insensitive, bi-directional type analysis problem. The basic idea is as follows: We first define a semi-lattice of abstract types. In the case of the Y2K problem, a lattice of subsets of the set {yearRelated; notYearRelated} (where yearRelated and notYearRelated are atomic types representing fields inferred to be year-related or not year-related, respectively) would suffice; although more complicated lattices could also be used. Known sources of year-related values, such as the year characters returned by the CURRENT-DATE library function in FIG. 3 are initialized to yearRelated. Sources of values known not to contain years (e.g., the non-year characters returned by CURRENT-DATE) are initialized to notYearRelated. A more detailed description of the type analysis method is described below. The result of the type analysis method as applied to the example in FIG. 3 is depicted in FIG. 4.

The interesting aspect of our analysis is not the type lattice itself, which is trivial, but the way in which the analysis is carried out efficiently and accurately on aggregates. This kind of analysis is applicable not only to the Y2K problem, but to other problems in which similar types must be propagated through aggregates, e.g., any problem involving field expansion of variables holding values of a particular logical (i.e., non-declared) type.

Defining a Mini Language

In order to facilitate the discussion of problems studied and the algorithms presented in this paper, we will use a small language, which is partly described by the following grammar:

| DataRef | ::= | ProgVars \| |
| | | DataRef[Int$_+$:Int$_+$] \| |
| | | DataRefint$_+$ |
| Stmt | ::= | DataRef ← DataRef |

This grammar describes the parts of a traditional imperative language necessary to describe our algorithm. A statement $d_1 \leftarrow d_2 \epsilon$ Stmt represents an assignment which copies the contents of data reference $d_2$ into $d_1$. For any program P, let Stmts(P) denote the set of such copy statements contained in the program.

A data reference d ∈ DataRef is a reference to some sequence of abstract locations (bytes) and takes one of the following forms:

- a program variable x ∈ ProgVars (the length of which will be denoted by $|x|$)
- a sub-range d[i : j] of locations i through j of some data reference d
- a single, statically indeterminate element of a data reference representing an array of n elements, denoted d\n Sub-ranges are used to represent a sequence of locations at a statically-determined position in a data reference. For example, if d refers to a record, then d[i : j] can be used represent a reference to a field of the record, and if d identifies an array, then d[i : j] can be used to represent a reference to the locations comprising a specific element of the array. The notation d\n is intended to suggest that if we break up the sequence of locations that d denotes into n sub-sequences of equal lengths, then d\n denotes one of these n different sub-sequences.

We now define the set of all locations as:

$$Loc = \{<x, i> | x \in ProgVars, 1 \leq i \leq |x|\}$$

Different elements of ProgVars thus represent disjoint sets of locations. (These are the "top level" variables, also called as level 01 variables in Cobol.) For convenience, we will denote location $<x; i>$ as simply $x[i]$. As explained above, we may not know the precise sequence of locations referred to by a data-reference d in the general case (e.g., due to a reference to an array element at a statically-indeterminate index). Hence, we treat a data-reference d as a reference to one of a set of sequences of locations, and we will denote this set by $D[d]$. Formally, we define D by:

$$D[x] = \{x[1] \cdot x[2] \cdot \ldots \cdot x[|x|]\} \text{ if } x \in ProgVars$$
$$D[d[i:j]] = \{\sigma[i] \cdot \sigma[i+1] \cdot \ldots \cdot \sigma[j] | \sigma \in D[d]\}$$
$$D[d\backslash n] = \sigma\{[s] \cdot \sigma[s+1] \cdot \ldots \cdot \sigma[e] \| \sigma \in D[d],$$
$$1 \leq i \leq n,$$
$$s = (i-1) * (|\sigma|/n) + 1,$$
$$e = i * (|\sigma|/n)\}$$

where σ[i] indicates the i-th element of sequence σ, and $|\sigma|$ denotes the length of a sequence σ. Further, we represent a sequence by enumerating its elements separated by a dot (.). Thus, a. b. c. denotes the sequence consisting of three elements a, b, and c. Note that all elements of D[d] have the same length, which we will denote $|d|$.

For example, let x, y ∈ ProgVars. Then, x[3 : 5] denotes the singleton set {x[3]. x[4]. x[5]}. A more interesting example is ((y[1 : 10])/2)[2 : 3]. Here, y[1 : 10]/2 is a referen arbitrary element of a 2-element array; the array as a whole occupies the first 10 locations of y. The sub-range [2..3] is then selected from the array element. Hence, the set of locations referred to consists of {y[2]. y[3], y[7]. y[8]}. In other words, ((y)[1 : 10])/2)[2 : 3] is a reference yo either locations y[2] and y[3] or locations y[7] and y[8].

Sometimes we may be interested only in the set of locations denoted by a data reference. For any sequence σ, let set(σ) denote the set {σ[i]| $1 \leq i \leq |\sigma|$} of elements in the sequence. For any data reference d, define Locs[d] to be ∪{ set(σ) |σ∈ D[σ]}. Locs[d] identifies the set of locations possibly denoted by a data-reference d. For example, consider the data-reference d=((y[1 : 10])/2)[2 : 3] (from the previous example). Locs[d] is, in this case, the set { y[2], y[3], y[7], y[8]}.

We will now define an abstract semantics $D^\nabla(d_1 \leftarrow d_2)$ for the assignment statement $d_1 \leftarrow d_2$, which simply consists of the set of all pairs of locations $(l_1; l_2)$, written symbolically as $l_1 \leftarrow l_2$, such that the assignment statement might copy the contents of location $l_2$ to location $l_1$. This semantics is defined as follows:

$$D^\nabla(d_1 \leftarrow d_2) = \{\sigma_1(i) \leftarrow \sigma_2(i) | \sigma_1 \in D[d_1], \sigma_2 \in D[d_2], 1 \leq i \leq \min(|\sigma_1|, |\sigma_2|).\}$$

In the rest of this document, we will assume that for every statement $d_1 \leftarrow d_2$, $|d_1| = |d_2|$.

As an example, consider the statement $x[1 : 2] \leftarrow y[3 : 4]$. This assignment statement, when executed, will copy the contents of location y[3] to location x[1] and the contents of location y[4] to location x[2]. The abstract semantics (defined above) of the statement $x[1:2] \leftarrow y[3:4]$ captures this information and is given by the set $\{x[1] \leftarrow y[3], x[2] \leftarrow y[4]\}$.

The abstract semantics for assignments that occur in a given program P ∈ Pgm can be used to define an equivalence relation on locations that will be useful in the sequel (e.g., as the basis for inferring equivalent types). To this end, we first define:

$$E = \cup\{D^\nabla(d_1 \leftarrow d_2) | d_1 \leftarrow d_2 \in Stmts(P)\}$$

Now, let $\equiv_P$ denote the smallest equivalence relation containing the set of pairs of locations E (i.e., the equivalence closure of E). We will omit the subscript P if no confusion is likely.

The equivalence relation defined above captures how information may flow between the different variables in a program. As an example, consider a program consisting of the two statements $x[1:2] \leftarrow y[3:4]$ and $z[5:6] \leftarrow x[1:2]$. As explained above, the abstract semantics of the first statement is the set: $\{x[1] \leftarrow y[3], x[2] \leftarrow y[4]\}$. Similarly, the abstract the second statement is the set $\{z[5] \leftarrow x[1], z[6] \leftarrow x[2]\}$. The set E is the union of these two sets and is given by $\{x[1] \leftarrow y[3], x[2] \leftarrow y[4], z[5] \leftarrow x[1], z[6] \leftarrow x[2]\}$. The equivalence relation defined above, in this case, partitions these locations into two equivalence classes (sets), namely $\{y[3], x[1], z[5]\}$ and $\{y[4], x[2], z[6]\}$. This reflects the fact that, during program execution, information may flow between locations y[3], x[1], and z[5]. Similarly, information may flow between location y[4], x[2], and z[6]. However, information WELL NOT flow from a location, say y[3], in one equivalence class to a location, say z[6], in another equivalence class.

The Equivalence DAG Data Structure

In this section we focus on the problem of computing the equivalence relation $\equiv_P$, given a program P. The goal of this section is to give the reader an understanding of the essential algorithmic contributions of this invention, primarily through examples. We will describe extensions and applications of this method in subsequent sections.

Rather than generate an explicit representation of the equivalence relation $\equiv_P$, we will actually generate a more compact representation of the equivalence relation that can be used to answer queries about whether two locations are equivalent or not. We will also refer to a statement $d_1 \leftarrow d_2$ as an equivalence constraint $d_1 \equiv d_2$ for notational convenience.

We start with a simple version of the problem, where every constraint has the form x≡y, where x, y ∈ ProgVars. In this case, rather than partitioning Loc into the equivalence classes, we can partition ProgVars into equivalence classes.

Then, $<x, i> \equiv_p <y,j>$ iff variables x and y are in the same equivalence class and i=j. The partitioning of ProgVars can be done as follows: initially place every program variable x ∈ ProgVars in an equivalence class by itself, and then process the equivalence constraints one by one; a constraint x≅y is processed by merging the equivalence classes to which x and y belong into one equivalence class. Preferably, this is accomplished utilizing the well-known union-find data-structure as described in Cormen, T., Leiserson, C., and Rivest, R, "Introduction to Algorithms," MIT Press, Cambridge, Mass., 1990; and Tarjan, R. E., "Data Structures and Network Algorithms," Society for Industrial and Applied Mathematics, Philadelphia, Pa., 1983, herein incorporated by reference in their entirety.

Now, consider a version of the problem where every constraint is of the form x[i:j]≅y[k:1], where x, y ∈ ProgVars. There are two aspects to the original solution that we would like to preserve when we address this generalized problem.

The first aspect is that the method processes every constraint in P exactly once, instead of using an iterative (e.g., transitive-closure-like) method.

The second aspect is that we would like to identify "ranges" of locations that are equivalent to each other and partition them into equivalence classes. This can represent $\equiv_p$ more compactly than a partition of the set of all locations into equivalence classes.

We now illustrate through an example how we can achieve these goals. Assume that W, X, Y, Z ∈ ProgVars, and that |W|=6, |X|=12, |y|=8, and |Z|=12. Assume that P consist of three equivalence constraints, X[5..8]≅Y[1..4], Z[1..6]≅W[1..6], and X[3..12]≅Z[1..210].

We start off by placing every variable in an equivalence class by itself.

We process the first constraint X[5..8]≅Y[1..4] as follows. We break up the range X[1..12] into three sub-ranges X[1..4], X[5..8], and X[9..12] and place each in an equivalence class by itself. We refer to this as adding breakpoints. We similarly break up range Y[1..8] into two sub-ranges Y[1..4] and Y[5..8], placing each in an equivalence class by itself. We then merge the equivalence classes to which X[5..8] and Y[1..4] belong into one.

Given this kind of a partition of every program-variable into a collection of sub-ranges, every location belongs to a unique sub-range of the partition. We can map every location l into a pair $(e_1, \sigma_1)$ where $e_1$ is the equivalence class of the unique sub-range containing l and $\sigma_1$ is the offset of the location within that sub-range. Further, locations $l_1$ and $l_2$ are equivalent ($l_1 \equiv $ if - 12) iff the $e_{11}=e_{12}$ and $\sigma_{11}=\sigma_{12}$. For example, location X[6] will be mapped to (ec(X[5..8]), 2) where ec(r) denotes the equivalence class containing sub-range r. Similarly, location Y[2] will be mapped to (ec(Y[1..4]), 2). Since ec(X[5..8])=ec(Y[1..4]), these two locations are equivalent.

Figure 6A:
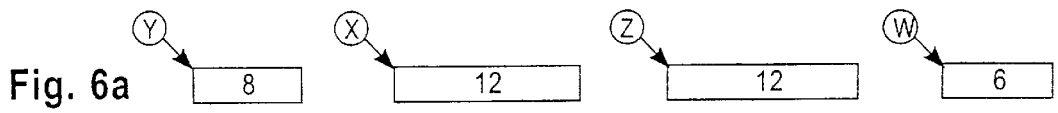
FIG. 6 is a pictorial illustration of the method for determining range equivalence according to the present invention.
Figure 6B:
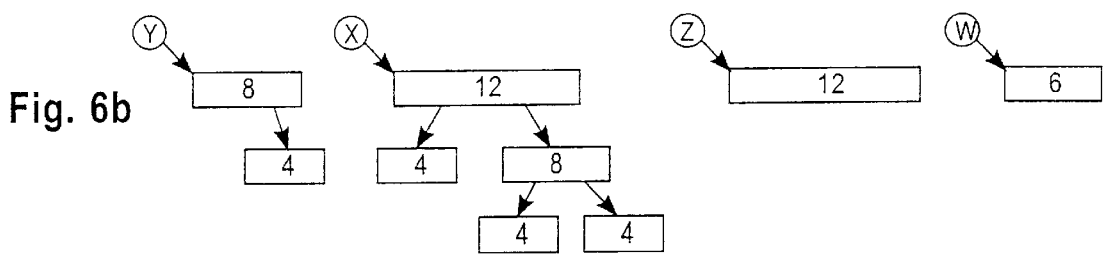
Figure 6C:
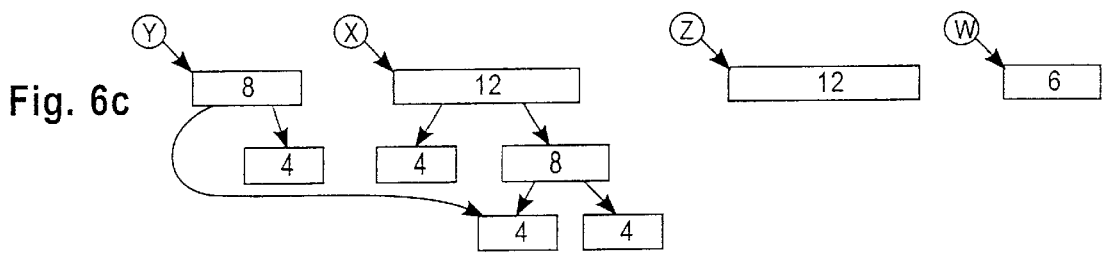

Let us briefly revisit the step where we "break up" a range, say X[1..12], into a sequence of sub-ranges, say X[1..4], X[5..8], and X[9..12]. It turns out to be convenient to keep both the original range and the new sub-ranges around, and to capture the refinement relation between these into a treelike representation (rather than, for instance, replacing the original range by the new sub-ranges). FIG. 6(a) and FIG. 6(b) illustrate the representations of the refinement of X and Y for the above example. Each rectangle in the figure, which we will refer to as a node, denotes an equivalence class of sub-ranges, and the number inside indicates the length of each sub-range contained in the equivalence class. Further, we will refer to a node as an internal node if it represents a range that has been broken up into smaller subranges and as a leaf node otherwise. FIG. 6(c) indicates the representation after X[5..8] and Y [1..4] have been merged.

Figure 6D:
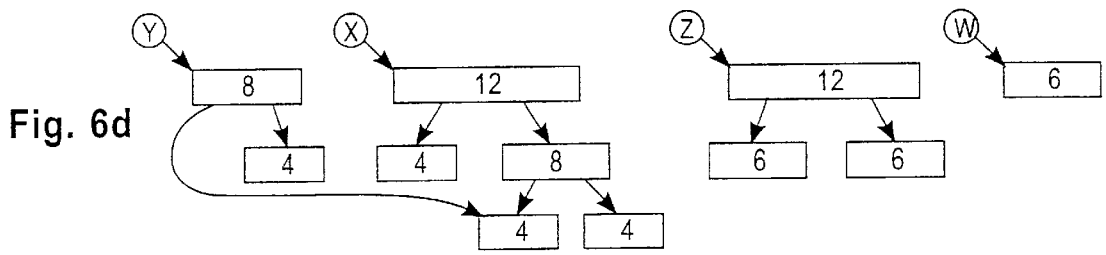
Figure 6E:
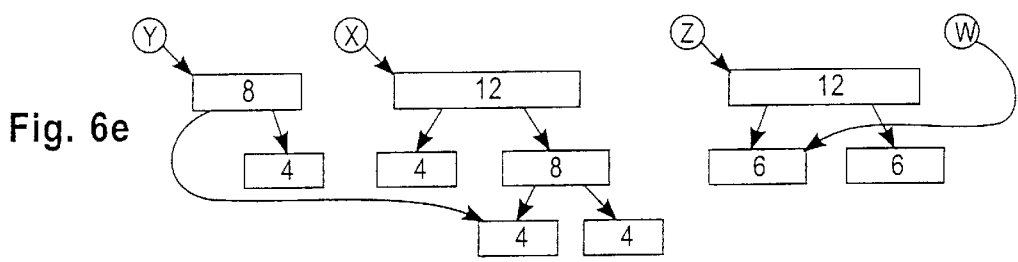

The next constraint (Z[1..6]; W[1..6]) is processed just like the first constraint, as illustrated by FIGS. 6(d) and 6(e).

In the general case, processing a constraint $d_1 \cong d_2$ consists of the following steps:

(i) first, adding breakpoints to the representation before the starting-location and after the ending-location of both $d_1$ and $d_1$;

(ii) the sub-ranges $d_1$ and $d_2$ can then be represented by a sequence of nodes, say $\sigma = [s_1, \ldots, s_k]$ and $\sigma_2 = [t_1, \ldots, t_m]$ respectively;

(iii) these two sequences are made equivalent to each other as follows: if $s_1$ and $t_1$ denote ranges of the same length, we simply merge the two into one equivalence class and proceed with the remaining elements of the sequence. If the two denote ranges of different lengths, we then break up the bigger range, say $s_1$, into two sub-ranges, $s_1$ and $s_1''$, such that $s_1$ has the same length as $t_1$. We then merge $s_1$ with $t_1$, and continue on, making the sequences $[s_1'', s_2 \ldots, Sk]$ and $[t_2, \ldots t_m]$ equivalent.

Figure 6F:
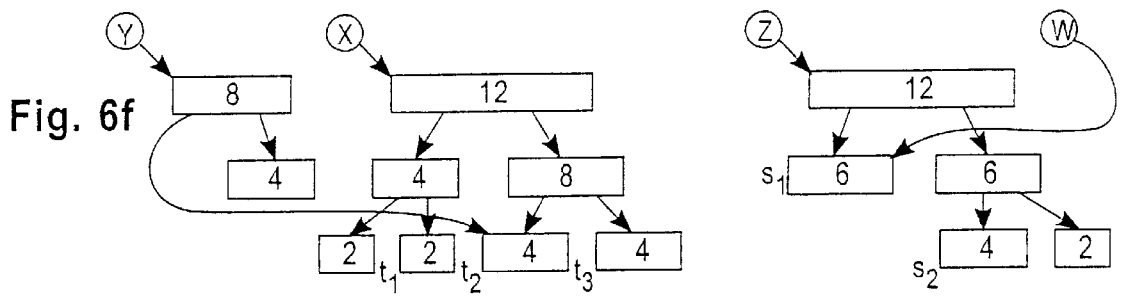
Figure 6G:
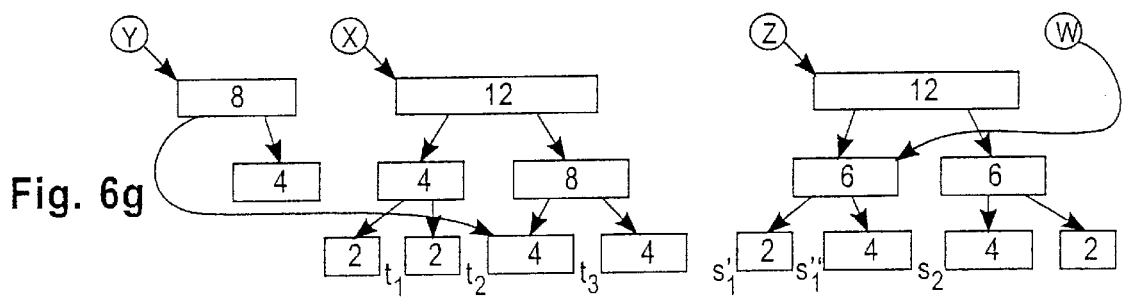
Figure 6H:
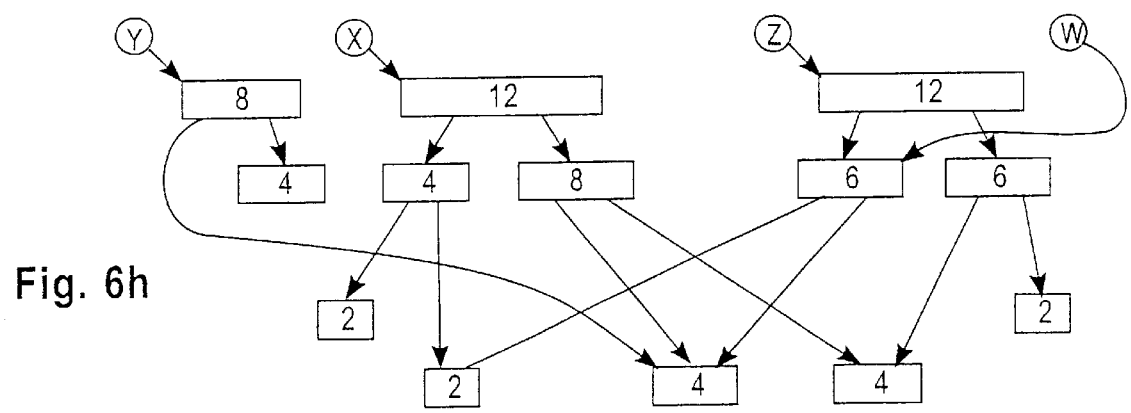

The third constraint X[3..12]≅Z[1..10] illustrates the more general scenario described above. After adding the necessary breakpoints, the range Z[1..10] is represented by the sequence $[s_1, s_2]$ (see FIG. 6(f)), while the range X[3..12] is represented by the sequence $[t_1, t_2, t_3]$. $s_1$ is longer than $t_1$, and is broken up into sub-ranges $s_1$ and $s_1''$, as shown in FIG. 6(g). After this, things are straightforward: $t_1$ is merged with $s_1$, $t_2$ is merged with $s_1''$, and $t_3$ is merged with $s_2$. FIG. 6(h) shows the resulting representation.

Clearly, given a location l, we can walk down the DAG (directed acyclic graph) as shown in FIG. 6(h), from the appropriate root to a leaf (see below) $e_1$ to map the location to a pair $(e_1, \sigma_1)$ $l_1 \equiv l_2$ iff $(e_{11}, \sigma_{11})=(e_{12}, \sigma_2)$. We call the representation generated by this method an Equivalence DAG.

In the above description of the method, we assumed that the nodes in the sequences $\sigma_1$ and $\sigma_2$ were leaf nodes. Even if that were true when the processing of the two sequences begins, when we get around to processing elements $s_i$ and $t_j$, the processing of the earlier elements of the sequences could have had the effect of adding breakpoints to either $s_i$ or $t_j$ or both, converting them into internal nodes. However, this is not a problem. We simply replace any internal node encountered in the sequences by its two children, and continue on. A simple example that illustrates this behavior is the single constraint A[1::12]≅A [5::16].

In the general version of the problem, a constraint $d_1 \cong d_2$ may consist of arbitrary data-references (see FIG. 5). For example, consider the following where P, Q, R ∈ ProgVars with |P|=20, |Q|=10, and |R|=2. Assume we have two constraints P[1..10]≅Q[1..10] and (P[1..20])/10≅R[1..2]. The first constraint is processed as described above, producing the representation illustrated in FIG. 7(a). The second constraint is processed as described above, producing the representation illustrated in FIG. 7(b). The nodes labeled u and v represent arrays consisting of 5 elements each of size 2.

A detailed description of the preferred methodology for constructing the Equivalence DAG for a program P is illustrated in the pseudo-code of FIGS. 11, 12 and 13, which we will explain in detail later on.

Type Analysis

In this section, the method for determining an equivalence relation described above is extended to address a generalization of the Y2K type analysis problem discussed earlier. This type analysis method can be used, for instance, to answer questions such as the following. Consider the example depicted in FIG. 6. Assume the programmer wants to modify the representation of a field of the variable W, say W[1 : 2]. What other variables are likely to be affected by this change, requiring corresponding modifications to their own representation?

We now present a precise formulation of the type analysis problem. Let L denote some semi-lattice with a join operator. We may think of the elements of L as denoting "abstract types." An example is the lattice of subsets of the set {fyearRelated, notYearRelated} used for year usage inference in the example of FIG. 3. Another simple lattice consists of only two elements Affected and NotAffected with Affected$\geq$NotAffected. This lattice is useful to answer questions about variables affected by some change, of the kind illustrated in the previous paragraph.

A function $\pi$ from Loc to L represents a "typing" for the set of locations. We say that $\pi$ is valid with respect to a program P if $\pi(l_1)=\pi(l_2)$ for all $l_1 \equiv_p l_2$. Now consider a constraint of the form $d \geq c$, where $d \in$ DataRef and $c \in$ L. We say that $\pi$ satisfies this constraint iff:

$\pi(l) \geq c$ for every $l \in$ Locs[d]

(In other words, the constraint $d \geq c$ says that every location denoted by data-reference d must have a type greater than or equal to c.) Given two typing functions $\pi_1$ and $\pi_2$, we say that $\pi_1 \geq \pi_2$ iff $\pi_1(l) > \pi_2(l)$ for all $l \in$ Loc.

Given a program P and a set C of constraints of the form $d \geq c$, where $d \in$ DataRef and $c \in$ L, we are interested in computing the least typing valid with respect to P that satisfies every constraint in C. For example, consider a constraint of the form $d \geq c$ where d is interpreted as representing a set of locations. The meaning of the constraint is that the type of every location in the set represented by d is at least c. In other words, every location in d may store a value of type c. Of course, it may store values of other types also, and this is what the "at least" part implies. Mathematically, this is captured by the inequality condition. The idea behind the definition of a valid typing is that if two locations $l_1$ and $l_2$ are equivalent (that is, in the same equivalence class), then there is a potential information flow between the two locations. Hence, we require the two locations to have the same type. Hence, we are interested in identifying a valid typing that satisfies all the constraints provided by the user. Further, we want the "least" valid typing satisfying this condition: in other words, the solution should say that a location l has a type t iff this is implied by the program and the constraints provided by the user.

We now illustrate how we can efficiently compute the desired solution, using the data structure and method presented earlier. We first process the equivalence constraints induced by program P to produce the Equivalence DAG. We then associate every leaf of the resulting DAG with a value from L, which is initially the least element of L. We then process every constraint $d \geq c$ in C as follows. The data-reference d can be mapped onto a sequence of leaves in the Equivalence DAG (possibly after adding new breakpoints). We update the value associated with each of these leaves to the join of their current value and c. The example in FIG. 8 illustrates this. Assume that we start with the Equivalence DAG shown in FIG. 6(h), and process the constraint W[1 : 2]$\geq$ Affected. We are using the lattice L consisting of only two elements Affected and NotAffected described above. W[1 : 2] corresponds to the single leaf u (shown as a bold rectangle in FIG. 8), whose value is then updated to Affected.

The resulting DAG can be viewed as a compact representation of the desired solution. In particular, it can be interpreted as a function $\pi$ from locations to L: the value associated with any location l is obtained by traversing the DAG to map location l to a leaf $e_1$ in the DAG (as explained earlier), whose value yields $\pi(l)$. In particular, the DAG in FIG. 8 maps locations X[3], X[4], Z[1], Z[2], W[1], and W[2] to type Affected and every other location to type NotAffe This indicates that the locations X[3:4] and Z[1:2] are potentially affected by the proposed change to the representation of W[1:2].

Term Unification

For any set X, $\Gamma_x$ denote set of terms defined by:

$\Gamma_x ::= X | \Gamma_x \oplus \Gamma_x | \Gamma_x \otimes \text{Int}_+$ where $\text{Int}_+$ denotes the set of positive integers. Sometimes, we will write a term $\tau \otimes j$ as $\tau^j$ for notational convenience. Let $\alpha = \cup_{i>0} V_i$ denote a set of variables. A variable belonging to $V_i$ is said to have a length i. We will use the notation x: i to indicate that a variable x has a length i. Consider the set of terms $\Gamma_\nu$. Note that $\Gamma_\nu$ denotes a set of symbolic expressions constructed from symbolic variables and integers, and two operators, $\oplus$ (sequence concatenation) and $\oplus \otimes$ (sequence exponentiation, which is the repeated concatenation of a sequence with itself as many times as indicated). Thus, $(a \oplus b)$, $(a \oplus b) \otimes 5$, and $((\oplus b) \otimes 5) \oplus ((c \oplus d) \otimes 10)$ are examples of such symbolic expressions.

Consider an Equivalence DAG. If we label the nodes (especially the leaf nodes) of the DAG with variable names, then we may interpret the "tree" rooted at any node in the Equivalence DAG as a term belonging to $\Gamma_\nu$: internal nodes obtained by breaking up a "range" into two sub-ranges are viewed as representing the operator $\oplus$; nodes such as u and v of FIG. 7, representing arrays, are viewed as representing the operator $\otimes$. In other words, T1 $\oplus$ T2 denotes a record-like aggregate consisting of two subcomponents T1 and T2, while T3 $\oplus$ i denotes an array aggregate consisting of i elements where T3 denotes a typical element of the array. For example, the tree pointed to by P in FIG. 7(a) can be represented by the term u$\oplus$v. If we want to indicate the lengths of the nodes, we can precisely represent this tree by the term (u: 10)$\oplus$(v: 10). For every program variable P let us use a term variable $x_p$ to denote the node in the Equivalence DAG that P points to. The whole Equivalence DAG can be thought of as a function that maps these term variables to terms belonging to $\Gamma_\nu$. (Such a function is also called a substitution.) For example, the Equivalence DAG in FIG. 7(b) represents a function $\{x_Q \rightarrow x_R^5; x_P \rightarrow (x_R^5) \oplus (x_R^5), x_R \rightarrow x_R\}$. Note that this gives us an alternative textual representation for Equivalence DAGs.

Our algorithm for constructing the Equivalence DAG can be thought of as unifying terms belonging to a term language $\Gamma_x$ with the following distinction: unlike in standard unification, we do not treat the operators $\oplus$ and $\otimes$ in this term language as free or uninterpreted operators; instead, we are interested in unification with respect to a specific interpretation of these operators. In particular, every term is interpreted as a sequence, with $\oplus$ interpreted as sequence concatenation and $\otimes$ as sequence exponentiation. The unification of two terms produces a substitution causing the two terms to become equivalent. The concept of unification is explained in detail in Knight, K. "Unification: A multi-disciplinary survey," ACM Computing Surveys 21, 1 (1989), pages 93–124, herein incorporated by reference in its entirety.

A complete description of our algorithm for constructing the Equivalence DAG and for performing type analysis, in SML-like pseudo-code, appears in FIGS. 11, 12, and 13. The method is based on the fast union-find data structure. We assume that an implementation of a union-find data structure is available with the signature shown in lines [1] to [6] of FIG. 11. The data structure may be implemented as described in Tarjan, R. E., "Data Structures and Network Algorithms," Society for Industrial and Applied Mathematics, Philadelphia, Pa., 1983, herein incorporated by reference in its entirety. The function newvar creates a new element not equivalent to any other element (i.e., belonging to an equivalence class all by itself). The function union merges two equivalence classes into one, while the function equivalent indicates if two elements are equivalent or not. In addition, every equivalence class has a value associated with it, whose type is the parameter 'α of the parametrized type 'α eqClass. The value associated with an equivalence class can be retrieved and modified by the two functions findval and setval respectively. The functions newvar and union also take a parameter specifying the value to be associated with the newly created/merged equivalence class.

We also assume the existence of a semi-lattice L (of types) with a join operator ∪ and a least element ⊥. This semi-lattice is determined by the type analysis problem to be solved.

The type term-var, defined in line [11], represents a set of term variables which are partitioned into a collection of equivalence classes (preferably using the union-find data structure). Every equivalence class has an associated value, which has the type term-value, defined in line [10]. For the sake of readability in the pseudo-code, we use pair(x,y) to represent the term x⊕y and array(i,x) to represent the term x⊗i.

Lines [12] through [16] of FIG. 11 define a function that returns the length |x| of a term x. Though |x| is presented as a function, the length information for every term may be cached rather than computed multiple times.

The function new defined in lines [17] through [20] of FIG. 11 is a convenience function. It creates a new variable, in an equivalence class by itself, with a given value by calling the function newvar, unless the value specified is an array consisting of a single element, in which case it simply returns the variable corresponding to the array element.

The function split, defined in lines [21] to [30], adds a breakpoint to the representation of variable x just after position n. The test in line [31] ensures that n has a meaningful value. The actual operation is dependent on the type of the current value of variable x. If it is an atom, then the atom is split into (a pair consisting of) two atoms of suitable lengths (line [24]). If it already a pair, then the split operation is performed on either the left or the right subterm, depending on position n (line [25]). If it is an array, then the array is broken into two arrays of suitable length, and the split operation is recursively invoked so as to perform it in the left or right subarray, as appropriate (lines [26]–[29]).

The function refine, defined in lines [31]–[38], converts a term into a list of (two) smaller subterms, by adding a breakpoint if necessary.

The function update, defined in lines [39]–[43], updates the value associated with a variable x such that every location contained in x has an associated type greater than or equal to the specified value c.

The function unify, defined in lines [44]–[57] of FIG. 12, unifies two terms. Depending on the types of the terms, this function calls one of the functions unify-atom, or unify-list, or unify-array.

The function unify-atom, defined in line [58], is used to unify two terms if at least one of them, say the first term, is an atom. In this case, the unification is done by invoking the function update on the first term to ensure that its value is greater than or equal to the constant value associated with the second (atomic) term. Then the value of the first term represents the result of the unification.

The function unify-list, defined in lines [59]–[66], is used to unify two lists of terms. If the first elements of both lists have the same length, then those two terms are unified, and the remaining elements of the two lists are unified with each other recursively. If the first elements of the two lists do not have the same length, then the bigger term is broken up into two smaller terms, and the list unification is repeated recursively.

The function unify-arrays, defined in lines [67]–[77], is used to unify two arrays. We determine the least-common-multiple 1 cm of the lengths of the two array elements e1 and e2. We repeatedly concatenate element e1 with itself to generate a term x1 of length 1 cm. We similarly concatenate element e2 with itself as many times as necessary to generate a term x2 of length 1 cm. We unify e1 and e2, and return an array whose element is e1.

Function convert, defined in lines [79]–[99] shows how a data-reference can be represented by a term-variable after some unification operations. Function processStatement, defined in line [100], shows how every copy assignment statement in the program can be processed by converting the left and right data-references into term-variables and by unifying them. Function processConstraint, defined in line [101], shows how a type inequality constraint can be processed by invoking the update function. Function typeAnalyze, defined in lines [102]–[108], shows how type analysis is done. Given a program and a set of type inequality constraints, type analysis is performed by invoking function processStatement on every assignment statement in the program and by invoking function processConstraint for every inequality constraint. If we want to construct the Equivalence DAG without performing type analysis, we can simply omit the parts of the code related to the semi-lattice L.

Atomization

In this section, we explain our atomization algorithm. Consider a language defined as follows, where Atoms is some set of atomic variables:

| | | |
|---|---|---|
| DataRef$_{Atomic}$ | ::= | Atoms / Int$_+$ |
| Stmt$_{Atomic}$ | ::= | DataRef$_{Atomic}$ ← DataRef$_{Atomic}$ |
| CompStmt$_{Atomic}$ | ::= | Stmt$_{Atomic}$ \| |
| | | StmtSeq ( CompStmt$_{Atomic}$, CompStmt$_{Atomic}$) \| |
| | | IfThenElse (CompStmt$_{Atomic}$, CompStmt$_{Atomic}$) |

This language allows for atomic variables and arrays of atomic variables, but nothing else. In particular, it does not allow any record-like aggregate that may consist of two or more atomic variables. The goal is to transform the given program into an equivalent program in this language. In particular, our method will show how every statement in the original program, possibly with references to aggregates, can be transformed into a collection of atomic statements, structured into a complex atomic statement belonging to CompSt$_{Atomic}$ defined by the above grammar. A complex atomic statement is either a single atomic statement, or the sequential composition StmtSeq(S1, S2) of two complex atomic statements, which are executed one after another, or is a conditional statement IfThenElse(S1, S2) which executes one of S1 and S2, depending on some unknown condition, which we omit from the representation.

We will now describe our atomization algorithm. The first step is to construct the Equivalence DAG by processing every statement in the program (as explained earlier). Note that every program variable corresponds to a node in the Equivalence DAG. We construct a tree representing the atomization of a variable by "flattening" the DAG rooted at the node corresponding to that program variable. The leaves of this atomization tree are the atoms. More formally, recall that the Equivalence DAG can be interpreted as a function $\phi$ mapping program variable to a term in $\Gamma_v$. We consider every occurrence of a variable in $\phi(x)$ to be a distinct atom. Let $\phi_r$ be the function obtained by renaming the variable occurrences in the set of terms $\{\phi(x_p) | P \in \text{ProgVars}\}$ such that no variable occurs twice. For example, if ProgVars=$\{A, B\}$, and $\phi=\{x_A \rightarrow w \oplus y \oplus w, x_B \rightarrow y \oplus z\}$, then a suitable renaming is $\phi_r=\{x_A \rightarrow x_1 \oplus x_2 \oplus x_3, x_B \rightarrow x_4 \oplus x_5\}$. Here, $\phi$ represents the Equivalence DAG and $\phi_r$ represents the set of atomization trees obtained by "flattening" the Equivalence DAG. The variables occurring in the set of terms $\{\phi_r(x_p) | P \in \text{ProgVars}\}$ (that is, the leaves of the atomization trees) give us the set of atoms. In the above example, the set of atoms is given by $\{x_1, x_2, x_3, x_4, x_5\}$.

Essentially, the Equivalence DAG combines two pieces of information: the first is a forest, the Atomization Forest, consisting of a tree for every program variable; the second is an equivalence relation on the leaves of this forest, which are referred to as atoms. The mapping $\phi_r$ represents only the Atomization Forest, giving us the "aggregate structure" that was inferred for every program variable. Unlike A, it omits the type equivalence that was inferred between the "atoms". For example, consider the example in FIG. 7(b). Here, $\phi(x_p)$ is $(x_R:2)^5 \oplus (x_R:2)^5$. By renaming the variables, we get $\phi_r(x_p)$ is $(x_1:2)^5 \oplus (x_2:2)^5$. This tells us that the aggregate variable P is a record consisting of two arrays, each consisting of 5 elements of size 2 each.

Given the atomization tree for every variable, the next step is to translate statements in the program to replace references to aggregate variables by references to atoms only. As an example, assume that our method identifies an atomization tree $(\alpha_1:2) \oplus (\alpha_2:4)$ for a variable X and an atomization tree $(b_1:2) \oplus (b_2:4)$ for a variable Y. Then, an assignment statement X←Y copies $b_1$ into $\alpha_1$, and $b_2$ into $\alpha_2$. Our algorithm will transform statement X←Y into the statement StmtSeq($\alpha_1$←$b_1$, $\alpha_2$←$b_2$). The whole program is transformed by translating every statement in the program in a similar fashion.

Our algorithm also replaces any reference to a variable in any other context (other than a copy assignment statement) by a reference to a set of atomic references. This is very easy to do, since we just need to use the set of atoms (leaves) of the atomization tree of the variable.

The general case is somewhat more complicated than explained above, since it may involve arbitrary data references instead of simple variables. A description of our complete algorithm, in pseudo-code form, appears in FIGS. 14 and 15. We will now explain the various functions defined in these figures.

The type AtomicTree defined in lines [111] and [112] represents the atomization trees explained above. Function normalize, defined in lines [113]–[116], is used to simplify some of our auxiliary procedures. In particular, it re-associates all pair2 nodes in an atomic-tree to make pair2 right-associative; that is, it converts all subtrees of the form pair2(pair2(x1,x2),x3) into the form pair2(x1, pair2(x2,x3)).

The functions tail, head, subrange, and breakup, defined in lines [117] through [135], assume that their inputs have been normalized by function normalize. Note that every atomic-tree x covers a set of locations numbered 1 through |x|. Function tail(t,u) returns the subtree of t that covers locations numbered 1 through |x|. Function head(t,u) returns the subtree of t that covers locations numbered 1 through u. Function subrange(t, u) returns the subtree of t that covers locations numbered f through u. (These functions assume that the given tree has a subtree covering the specified locations.) Function breakup(t,s) returns a set of subtrees of t, each covering s locations. In particular, it returns a subtree covering locations 1 through s, a subtree covering locations s+1 through 2s, a subtree covering locations 2s+1 through 3s, and so on.

Functions atomizeVar and mkAtomicTree, defined in lines [136]–[141], are used to construct the atomization tree for a variable by "flattening" the DAG (term) associated with that variable. This function also computes the multiplicity of every leaf (atom) of the constructed tree, for subsequent use, where we define the multiplicity $\mu(\alpha)$ of an atom $\alpha$ to be the product of the "cardinalities" of the arrays containing the atom.

A (top level) program variable corresponds to an atomization tree. In the general case, an arbitrary data reference corresponds to a set of atomic trees. Function trees of, defined in lines [143]–[145], converts a data-reference into a collection of atomic-trees that cover the data-reference. Function atomizeTree, defined in lines [146]–[148], converts an atomic-tree into a sequence of atomic-references. This is basically the sequence of leaves of the given atomic-tree.

Function atomizeProgram, defined in lines [155]–[170], shows how atomization is done for a program. All assignment statements and data-references in the program are processed, as shown in lines [156]–[161], to determine how variables are used in the program. Then, the atomization can be determined for every variable as shown in lines [162]–[164]. This can then be used to convert every assignment statement in the program into a collection of assignments of atomic-references (lines [165]–[167]) and to convert every other data-reference in the program into a reference to a set of atomic-references (lines [168]–[170]).

Other Applications and Embodiments

The methods described earlier can be used to perform various program analyses and program slicing more efficiently as follows. We can define an equivalence relation on the statements of the program by making two statements equivalent if they refer to atomic variables that are equivalent (as indicated by the Equivalence DAG data structure). If a program analysis is to be performed to determine program properties that hold true at a particular statement S1 in a program P, we can construct a smaller program Q consisting only of statements in the original program P that are equivalent to the statement S1 and perform the desired program analysis on the smaller program Q. Similarly, if we want to compute a slice with respect to some statement S1 in a program P, we can construct a smaller program Q consisting only of statements in the original program P that are equivalent to the statement S1 and perform the slicing operation on the smaller program Q.

Though our description of the preferred embodiment of our invention uses the union-find data structure, it is also possible to implement our ideas without using the union-fmd data structure. In we do not place nodes in the Equivalence DAG into equivalence classes, the resulting data structure will be a forest, which corresponds to the Atomization Forest described earlier. In this case, processing the statements in the program, as outlined earlier, will potentially modify this forest. It is necessary to repeat the processing of the statements in the program until the processing causes no more modifications to the Atomization Forest.

While the invention has been described in connection with specific embodiments, it will be understood that those with skill in the art may develop variations of the disclosed embodiments without departing from the spirit and scope of the following claims.

We claim:

1. A program storage device readable by a machine, tangibly embodying a series of instructions executable by the machine to perform method steps for analyzing a computer program comprising a plurality of aggregate variables and a plurality of statements and generating data that characterizes use of said variables, said method steps comprising:

(i) for every aggregate variable in the program, initializing data associated with the said variable to refer to a range of locations that the said aggregate variable denotes;

(ii) for every reference in the program to a subset of the locations denoted by an aggregate variable, modifying the data associated with the said variable by adding breakpoints corresponding to the endpoints of the range of locations that the said reference denotes; and (iii) for at least one statement that copies the contents of a range R1 of locations of an aggregate variable V1 to a range R2 of locations of an aggregate variable V2,
      (a) identifying the breakpoints in the range R1 from the data associated with variable V1, and modifying the data associated with variable V2 to add breakpoints at corresponding locations within range R2, and
      (b) identifying the breakpoints in the range R2 from the data associated with variable V2, and modifying the data associated with variable V1 to add breakpoints at corresponding locations within range R1.

2. The program storage device of claim 1, further comprising the steps of:

(iv) for each range of locations bounded by any two successive breakpoints identified in steps (ii) or (iii), creating an atom to represent said range of locations; and (v) for at least one reference R in the program denoting a set SL of locations, identifying the set of atoms AR corresponding to said set SL of locations and replacing said reference R by the set AR.

3. The program storage device of claim 2, further comprising the step of:

(vi) for at least one statement S in the program that copies the contents of a range of locations RL1 to a range of locations RL2, and for every atom AS1 denoting a range of locations contained within RL1, identifying an atom AS2 that denotes a corresponding range of locations within RL2, adding a statement that copies the contents of atom AS1 to atom AS2, and finally removing the original statement S.

4. The program storage device of claim 3, further comprising the step of:

(vii) performing reaching definitions analysis on the transformed program generated by step (vi).

5. The program storage device of claim 3, further comprising the step of:

(vii) performing a program slicing operation on the program generated by step (vi).

6. The program storage device of claim 1, further comprising the steps of:

(iv) representing at least one range of locations bounded by two breakpoints identified in steps (ii) or (iii) by a node;

(v) initializing every node identified in step (iv) to refer to an equivalence class containing only the node itself; and (vi) for every statement that copies the contents of a range R1 of locations of a variable V1 to a range R2 of locations of a variable V2, performing the following substeps:
      (a) for every node A1 denoting a set of locations contained in R1, identifying or creating a node A2 denoting a corresponding set of locations contained in R2, and merging the equivalence class containing A1 and the equivalence class containing A2 into one equivalence class; and
      (b) for every node A3 denoting a set of locations contained in R2, identifying or creating a node A4 denoting a corresponding set of locations contained in R1, and merging the equivalence class containing A3 and the equivalence class containing A4 into one equivalence class.

7. The program storage device of claim 4, further comprising the steps of:

(vii) identifying at least one range of locations RL;

(viii) determining the set DA of all nodes corresponding to a range of locations contained within said range RL; and (ix) determining the set AFF of all nodes belonging to the same equivalence class as some node in the set DA.

8. The program storage device of claim 6, further comprising the steps of:

(vii) for every node U, computing a value UVAL belonging to a semi-lattice SL and associating the said value UVAL with node U; and (viii) for every equivalence class C generated in step (v) or (vi), computing a value CVAL equal to the semi-lattice join of the set of semi-lattice elements associated with the nodes in the said equivalence class C, and associating said value CVAL with the said equivalence class C.

9. The program storage device of claim 8, further comprising the steps of:

(ix) identifying at least one range of locations RL;

(x) determining the set DA of all nodes corresponding to a range of locations contained within said range RL; and (xi) determining the type lattice element L associated with the equivalence class C containing some node NOUT in the said set DA.

10. The program storage device of claim 9, wherein the elements of the semi-lattice SL are sets of program attributes, and the semi-lattice join operation is set union, and wherein the value UVAL associated with a node U in step (viii) is determined by identifying the set of program attributes attached to the set of locations LOCS corresponding to said node U in the declaration of the variable corresponding to said set of locations LOCS, further comprising the step of:

(xii) reporting to the user of the program storage device via an output device the semi-lattice element L determined in step (xi) as the set of attributes inferred for the set of locations associated with node NOUT.

11. The program storage device of claim 8, wherein the semi-lattice SL consists of only two elements AFFECTED and NOTAFFECTED, and the join operation on a set SS of values returns AFFECTED if AFFECTED is an element of said set SS and returns NOTAFFECTED otherwise, further comprising the steps of:

(ix) using an input device, allowing the user of the program storage device to designate a set of locations ALT altered by a proposed program modification;

(x) for every node U, computing the value UVAL used in step (vii) to be AFFECTED if the set of locations corresponding to U overlaps with the said set of locations ALT and letting the value UVAL be NOTAFFECTED otherwise; and (xi) for every equivalence class C whose associated value CVAL computed in step (viii), is equal to AFFECTED, reporting to the user of the program storage device via an output device all the locations associated with any node belonging to the said equivalence class C, as the set of locations affected by the proposed modification.

12. A method for analyzing a computer program comprising a plurality of aggregate variables and a plurality of statements and generating data that characterizes use of said variables, the method comprising the steps of:

(i) for every aggregate variable in the program, initializing data associated with the said variable to refer to a range of locations that the said aggregate variable denotes;

(ii) for every reference in the program to a subset of the locations denoted by an aggregate variable, modifying the data associated with the said variable by adding breakpoints corresponding to the endpoints of the range of locations that the said reference denotes; and (iii) for at least one statement that copies the contents of a range R1 of locations of an aggregate variable V1 to a range R2 of locations of an aggregate variable V2, (a) identifying the breakpoints in the range R1 from the data associated with variable V1, and modifying the data associated with variable V2 to add breakpoints at corresponding locations within range R2, and (b) identifying the breakpoints in the range R2 from the data associated with variable V2, and modifying the data associated with variable V1 to add breakpoints at corresponding locations within range R1.

13. The method of claim 12, further comprising the steps of:

(iv) for each range of locations bounded by any two successive breakpoints identified in steps (ii) or (iii), creating an atom to represent said range of locations; and (v) for at least one reference R in the program denoting a set SL of locations, identifying the set of atoms AR corresponding to said set SL of locations and replacing said reference R by the set AR.

14. The method of claim 13, further comprising the step of:

(vi) for at least one statement S in the program that copies the contents of a range of locations RL1 to a range of locations RL2, and for every atom AS1 denoting a range of locations contained within RL1, identifying an atom AS2 that denotes a corresponding range of locations within RL2, adding a statement that copies the contents of atom AS1 to atom AS2, and finally removing the original statement S.

15. The method of claim 14, further comprising the step of:

(vii) performing reaching definitions analysis on the transformed program generated by step (vi).

16. The method of claim 14, further comprising the step of:

(vii) performing a program slicing operation on the program generated by step (vi).

17. The method of claim 12, further comprising the steps of:

(iv) representing at least one range of locations bounded by two breakpoints identified in steps (ii) or (iii) by a node;

(v) initializing every node identified in step (iv) to refer to an equivalence class containing only the node itself; and (vi) for every statement that copies the contents of a range R1 of locations of a variable V1 to a range R2 of locations of a variable V2, performing the following substeps:

(a) for every node A1 denoting a set of locations contained in R1, identifying or creating a node A2 denoting a corresponding set of locations contained in R2, and merging the equivalence class containing A1 and the equivalence class containing A2 into one equivalence class; and (b) for every node A3 denoting a set of locations contained in R2, identifying or creating a node A4 denoting a corresponding set of locations contained in R1, and merging the equivalence class containing A3 and the equivalence class containing A4 into one equivalence class.

18. The method of claim 17, further comprising the steps of:

(vii) identifying at least one range of locations RL;

(viii) determining the set DA of all nodes corresponding to a range of locations contained within said range RL; and (ix) determining the set AFF of all nodes belonging to the same equivalence class as some node in the set DA.

19. The method of claim 17, further comprising the steps of:

(vii) for every node U, computing a value UVAL belonging to a semi-lattice SL and associating the said value UVAL with node U; and (viii) for every equivalence class C generated in step (v) or (vi), computing a value CVAL equal to the semi-lattice join of the set of semi-lattice elements associated with the nodes in the said equivalence class C, and associating said value CVAL with the said equivalence class C.

20. The method of claim 19, further comprising the steps of:

(ix) identifying at least one range of locations RL;

(x) determining the set DA of all nodes corresponding to a range of locations contained within said range RL; and (xi) determining the type lattice element L associated with the equivalence class C containing some node NOUT in the said set DA.

21. The method of claim 20, wherein the elements of the semi-lattice SL are sets of program attributes, and the semi-lattice join operation is set union, and wherein the value UVAL associated with a node U in step (viii) is determined by identifying the set of program attributes attached to the set of locations LOCS corresponding to said node U in the declaration of the variable corresponding to said set of locations LOCS, further comprising the step of:

(xii) reporting to the user of the program storage device via an output device the semi-lattice element L determined in step (xi) as the set of attributes inferred for the set of locations associated with node NOUT.

22. The method of claim 19, wherein the semi-lattice SL consists of only two elements AFFECTED and NOTAFFECTED, and the join operation on a set SS of values returns AFFECTED if AFFECTED is an element of said set SS and returns NOTAFFECTED otherwise, further comprising the steps of:

(ix) using an input device, allowing the user of the program storage device to designate a set of locations ALT altered by a proposed program modification;

(x) for every node U, computing the value UVAL used in step (vii) to be AFFECTED if the set of locations corresponding to U overlaps with the said set of locations ALT and letting the value UVAL be NOTAFFECTED otherwise; and (xi) for every equivalence class C whose associated value CVAL computed in step (viii), is equal to AFFECTED, reporting to the user of the program storage device via an output device all the locations associated with any node belonging to the said equivalence class C, as the set of locations affected by the proposed modification.

* * * * *